US008751780B2

(12) United States Patent
Green et al.

(10) Patent No.: US 8,751,780 B2
(45) Date of Patent: Jun. 10, 2014

(54) FAST MACHINE BOOTING THROUGH STREAMING STORAGE

(75) Inventors: Dustin L. Green, Redmond, WA (US); Jacob K. Oshins, Seattle, WA (US); Michael L. Neil, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 624 days.

(21) Appl. No.: 12/701,624

(22) Filed: Feb. 8, 2010

(65) Prior Publication Data
US 2011/0197052 A1    Aug. 11, 2011

(51) Int. Cl.
G06F 15/177    (2006.01)
G06F 12/00    (2006.01)

(52) U.S. Cl.
USPC .................................... 713/2; 713/1; 711/100

(58) Field of Classification Search
None
See application file for complete search history.

(56) References Cited

U.S. PATENT DOCUMENTS

| 5,842,011 | A  | * | 11/1998 | Basu ................................. 713/2 |
| 6,925,533 | B2 |   | 8/2005  | Lewis |
| 7,281,124 | B2 |   | 10/2007 | Rothman et al. |
| 7,366,868 | B2 |   | 4/2008  | Reuter et al. |
| 7,406,617 | B1 |   | 7/2008  | Athreya et al. |
| 2005/0289218 | A1 |   | 12/2005 | Rothman et al. |
| 2007/0234337 | A1 | * | 10/2007 | Suzuki et al. .................. 717/168 |
| 2007/0260831 | A1 |   | 11/2007 | Michael et al. |
| 2007/0294676 | A1 |   | 12/2007 | Mellor et al. |
| 2008/0086611 | A1 | * | 4/2008  | Fujibayashi .................. 711/162 |
| 2008/0172448 | A1 |   | 7/2008  | Wonus |
| 2009/0006534 | A1 |   | 1/2009  | Fries et al. |
| 2010/0037041 | A1 | * | 2/2010  | Joshi et al. ........................ 713/2 |
| 2010/0241807 | A1 | * | 9/2010  | Wu et al. ...................... 711/118 |

FOREIGN PATENT DOCUMENTS

WO    2008073618 A2    6/2008

OTHER PUBLICATIONS

Wu et al., U.S. Appl. No. 61/162,463, Virtualized Data Storage Over Wide-Area Networks, filed Mar. 23, 2009, pp. 1-31.*

* cited by examiner

*Primary Examiner* — Dennis M Butler
(74) *Attorney, Agent, or Firm* — John Jardine; Andrew Sanders; Micky Minhas (57) ABSTRACT

Described is a technology by which a virtual hard disk is maintained between a far (e.g., remote) backing store and a near (e.g., local) backing store, which among other advantages facilitates fast booting of a machine coupled to the virtual hard disk. Read requests are serviced from the near backing store (e.g., a differencing layer) when the data is available thereon, or from the far backing store (e.g., a base layer) when not. The near backing store may be configured with a cache layer that corresponds to the base layer and a write differencing layer that stores writes, or a single differencing layer may be used for both caching read data and for storing write data. A background copy operation may be used to fill the cache until the far backing store data is no longer needed.

19 Claims, 6 Drawing Sheets

FAST MACHINE BOOTING THROUGH STREAMING STORAGE

BACKGROUND

With remote storage becoming commonplace, there are many situations in which a computer system that has local storage does not have some data that it needs stored locally. For example, a computing machine may have previously had its local storage backed up, however the current disk data for the machine may be lost or corrupted, with the backup disk data stored on a different machine. Another example is when a new physical machine is being provisioned and has an empty hard drive. The machine is network-booted by copying an operating system image to the local hard drive so that it can reboot from the local drive.

As another example, a computer system may host one or more virtual machines, each virtual machine comprising software that executes to act as a physical machine. A virtual machine may use one or more virtual hard disks, each of which is basically a file or other storage extent (e.g., a disk, partition on a disk or the like) that is configured to operate as a physical hard disk drive. A virtual machine library may be composed of "gold images" that represent disk contents corresponding to a virtual machine template, for efficiently creating a number of virtual machines that start out almost identical to each other. However the host physical machine may not have the gold image data stored locally, or may not have other potentially large amounts of virtual disk data stored locally.

The process of copying data to the host computer can take a very long time, e.g., on the order of minutes, whereby a computer system or virtual machine on a computer system cannot quickly be booted up. One solution to avoiding the long delay foregoes the use of local storage, and instead stores data on network-based storage (e.g., Fibrechannel, iSCSI, SAN, SMB). While this solution allows the computer system/virtual machine to start relatively quickly, network resources and network-based storage resources continue to be consumed indefinitely. Reliance on network storage also leaves the computer system/virtual machine subject to network-based storage failures. Further, depending on the network-based storage technology, the performance also may be reduced relative to the performance that is achievable by using local storage. Still further, existing technologies that allow remote storage to appear as if it were local storage are generally significantly more expensive than conventional local storage.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a virtual storage device for a physical or virtual computing machine is maintained as a chain of data structures (e.g., files) including far data maintained at a far (e.g., remote) backing store and near data maintained at a near (e.g., local) backing store (which initially may be empty). When data is needed to service a read operation, the near data, such as comprising at least one differencing layer (e.g., a diff file of a virtual hard disk) therein is accessed to provide the data if it is available. Otherwise, the far data, such as comprising a base layer, is accessed to provide the data. Writes may be written to the near data, such as to a differencing file therein, if desired. Writes may be propagated further along the chain as desired, such as to more than one diff layer and/or all the way to the base layer.

The technology facilitates fast boot because the virtual disk is available for use immediately, rather than needing to download an entire operating system image before booting from that downloaded image. For example, during a boot operation, only a relatively small amount of data is needed from the boot disk, which is available from the far data and/or the near data.

In another aspect, a background copy operation may copy far data from the far backing store to near data in the near backing store. The background-copied data, in addition to any writes and cached reads, fills the near data (e.g., diff file or files) in the near backing store. When all data has been copied, the background copying as well as any other communication with the far data store may be stopped if desired.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards storing data in a chain of data structures (e.g., differencing and base layers) that form a virtual storage device such as a virtual block device, in which the chain is terminated in a backing store file or block device (or the like) maintained in far (remote) storage. Each data structure can sparsely represent regions of the virtual storage device, such that when taken together by having overlapping regions represented further along the chain overridden by a region that is in near data, a complete set of data such as a virtual hard disk is provided. For example, a data range of 0-16 megabytes may be stored on a local disk, while range 16-32 megabytes may be stored in a remote file on a remote disk, and so on.

The far data and near data that backs the virtual storage device may be referred to as "backing data," and the containers within which the backing data are stored may be referred to as the "far backing store" or "near backing store" depending on its location. Accessing far data is often relatively slow or expensive compared to accessing near data. A file may serve as a backing store, or a disk may directly serve as a backing store without a conventional file system layer. A file-based backing store can be stored locally or remotely. A disk-based backing store may be a locally-attached disk, or a network-accessible disk such as a SAN LUN.

Note that a backing store need not be a single location or in any particular format, as long as the correct data is provided upon request. Thus, a backing store may be distributed among many locations and/or machines. For example, a single backing store may store backing data for a single virtual disk, or for more than one virtual disk. Also, a single backing store may only store part of the backing data of a virtual disk, that is, the backing data for a virtual disk may be spread among more than one backing store. A backing store may be a single disk image that has two different differencing layers, such as for a single image that boots on two machines. A backing store may comprise a block database that contains blocks from multiple disk images. The backing store data for a virtual disk may be sparse or non-sparse.

Moreover, the backing data need not be maintained on a traditional disk or storage device, and may be any arrangement of data, not necessarily what is typically considered a file or disk. For example, in addition to a disk or files of various formats, a backing file may be maintained as a database of blocks, as a log of reads and writes, and so on.

The backing data access is from near data when available, or far data when not. While a machine that accesses the backing data is running, data can be copied to near storage to eventually allow the chain to be cut without impacting the contents of the virtual storage device. Once copied, the far backing store is no longer needed.

The virtual storage device represented by the chain of data structures may be used to boot a machine (virtual or physical). Even when all (or most) of the data needed for boot is far data in the far backing store, the boot is still fast, because only the data needed at any time during boot is accessed, rather than downloading the entire operating system image.

While some of the examples herein are generally directed towards a virtual machine (VM) and a block storage device, it should be understood that any of the examples described herein are non-limiting examples. The benefits obtained from the chained storage described herein may be accomplished by any tracked combination of far and near data. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing and data storage in general.

Figure 1:
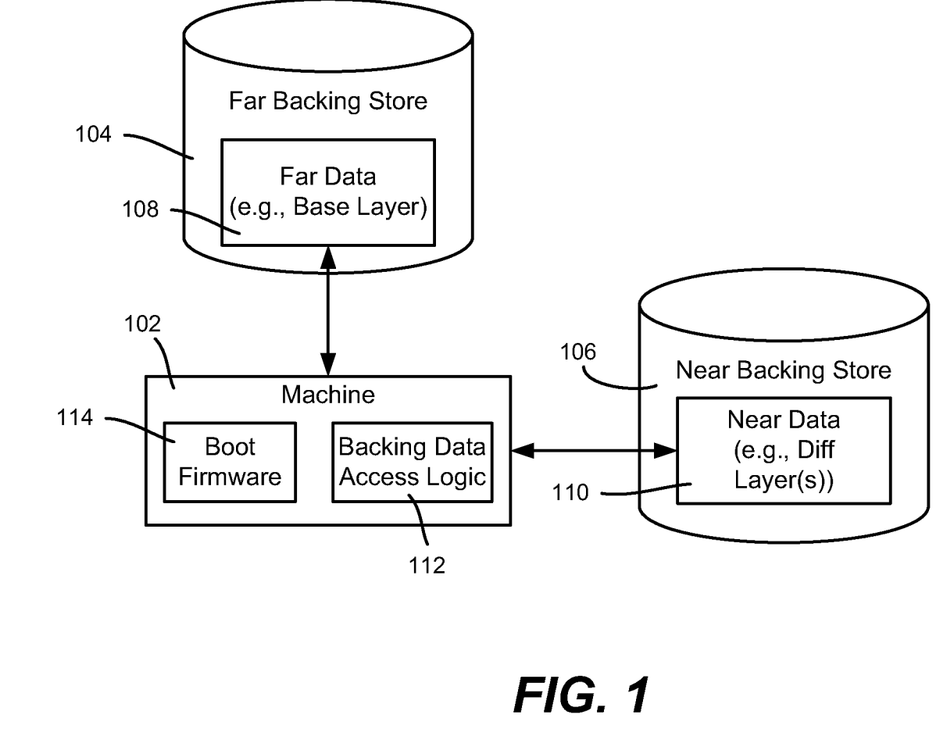
FIG. 1 is a block diagram showing example components for providing a virtual storage device (e.g., a virtual disk) for use by a machine, via far data maintained at a far backing store and/or near data maintained at a near backing store.

FIG. 1 shows a computing environment in which a machine 102 (physical or virtual) is coupled to a far backing store 104 and to a near backing store 106. The far backing store 104 contains far data 108 such as a file, (e.g., some or all of a virtual hard disk, such as a base layer) or other arrangement of data. The near backing store 106 contains near data 110, such as one or more files (such as one or more differencing "diff" layers) or other arrangement of data, which when combined with the far data 108 forms a virtual (e.g., block) storage device comprising a complete set of backing data. As described below, backing data access logic 112 accesses the near and far backing store data appropriately to make this combination. Note that the near data 110 initially may be empty, but in general this data gets filled in over time as described below, e.g., as reads and writes occur, and optionally in a background copying operation.

Because when chained the far and near backing data 108 and 110, respectively, forms a complete set of data, e.g., a virtual hard drive, existing software does not need to be modified to access the data. This includes software and boot firmware within a virtual machine being managed by a virtual machine manager (hypervisor).

With respect to fast booting, for example, because the backing files form a complete set of data (e.g., a virtual disk) from the perspective of the machine 102, the machine can immediately boot from the data without requiring an image to be copied first. To this end, boot firmware 114 identifies the data it needs to start the boot, which is only a small amount of data relative to an entire operating system image. Thus, even if no data is available locally, the backing file access logic 112 can request and receive only the needed data, whereby the boot starts right away, e.g., on the order of seconds rather than minutes.

By way of example, firmware may be configured to use PXE (Preboot Execution Environment) technology to load code to run. Other firmware may be configured to use Internet SCSI (iSCSI), which makes a remote storage device resemble a local disk, whose data can be used for boot, such as mirrored to the near data 110. Fibrechannel over Ethernet (FCoE) may be used in a similar manner to iSCSI with respect to booting a machine.

In addition to obtaining boot-related data, the backing file access logic 112 may optionally copy data from the far data 108 to the near data 110 in a background operation. Note that the background copying is (ordinarily) lower in priority than servicing on-demand reads. The background copy operation gradually improves performance due to more and more data being available in the near data 110, which is typically faster to access than far data 108 in the far backing store 104. Eventually, the complete data set is available in the near data 110, and the remote connection may be dropped without the machine 102 needing access to the far data 108. In this way, the machine can be optionally freed from relying on the far data for continued operation of the machine. Note that background copying may be stopped if desired without affecting the use of the virtual storage device, e.g., if the local storage gets full, or for any other reason.

Further note that the background copying operation is optional, generally because there are some situations where it is not necessary. For example, if a virtual machine is to be started up quickly to perform some task and then stopped shortly thereafter, then obtaining a complete set of near data (e.g., a virtual hard disk) for that short-lived virtual machine is an unnecessary waste of resources. However, like other operations, this storage strategy can be changed while the virtual storage device remains in use by starting (or stopping) the background copy operation as desired.

Thus, changes to the storage strategy of the virtual disk, such as a change to how written data is stored (a change to the write-through depth, described below) are allowed to be processed concurrently with usage of the virtual storage device. Some regions of the virtual storage device may have a different storage strategy than other regions.

As described above, data reads are serviced at a higher priority than background copying. For efficiency, any data regions read from the far data 108 may be opportunistically cached in the near data 110 (e.g., written out to a diff layer) as part of the read process. This allows recently-read data to be quickly available if needed again, without waiting for background copying to reach this same region. Note that the background copying process can skip over copying already-read data via a suitable tracking mechanism.

With respect to data written by the machine 102, written data can be written-through immediately up to any level (write-through depth) of the chain, which is configurable, including all the way back to the far data 108 if desired. The choice of which level of the chain to propagate the write back to depends on the reliability of the physical storage at each level of the chain, and the reliability requirements on the virtual storage device. Note that the write-through depth may be changed while the virtual storage device is in use; if the level goes up to the far data 108, the backing file access logic 112 may copy previously-written near data 110 to the far data 108 in a background operation and/or in a flushing operation.

In one implementation, the cached data (reads) are distinguishable from written data (sometimes referred to as "dirty data") to enable optimization of virtual storage device management operations. In other words, cached data is known by the system to be present in another, remote location, so cached data can be discarded if needed, for example; (although if discarded, the far data 108 may need to remain or again become accessible for the machine 102 to properly operate). In contrast, written data maintained in the near data 110 typically cannot be discarded, that is, unless the written data was known to have been written through all the way back to the far data 108.

A virtual disk may be constructed from one or more layers of backing data. Each layer has a possibly-sparse representation of data that exists at offsets of the virtual storage device. A simple virtual disk has only one layer of backing store data, with both reads and writes being serviced from this single layer. When a read from the virtual disk occurs, the read is translated into corresponding reads of the backing data corresponding to the requested virtual block device offset range. If the backing data is sparsely represented, it is possible that a read will be from virtual block device offsets that do not currently have any backing store data, in which event the read may be serviced by filling the read buffer with zeroes. Writes are serviced by translating to corresponding writes to the backing data, possibly requiring a new region of backing data to be created before the new region is written to.

Figure 2:
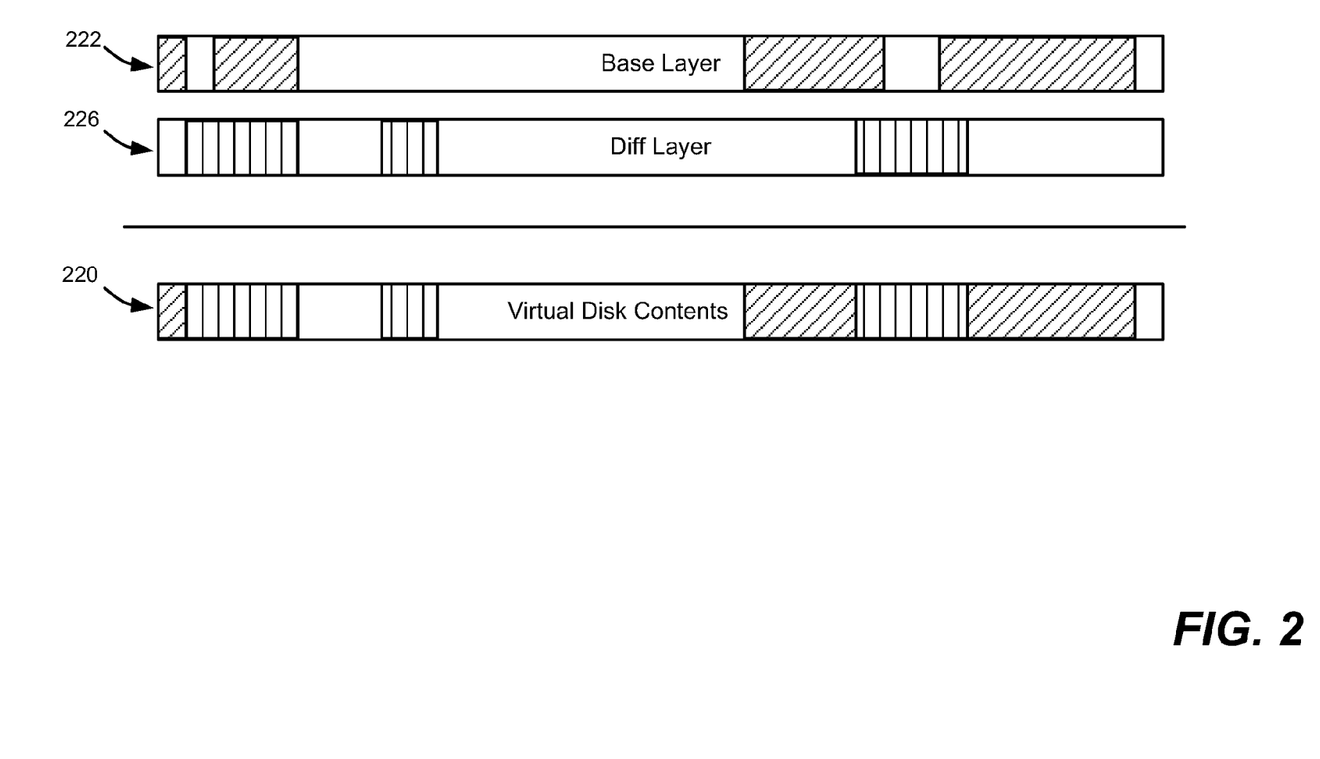
FIG. 2 is a representation of a two-layered virtual disk that may be used to maintain the virtual storage device data between the far data comprising a base layer and the near data comprising a diff layer.

With respect to multiple layers, as in FIG. 2, for example, a virtual disk 220 with two layers 222 and 226 is formed by using the data of the diff (differencing) layer 226 wherever it exists, and then using the data of the base layer 222 when needed. In the context of near data and far data, the base layer 222 may contain the far data 108, while the diff layer 226 may contain the near data 110. Note that some or all of the overlapping regions between the two layers may contain identical data, and such identical regions may be tracked as the cached data.

Figure 3:
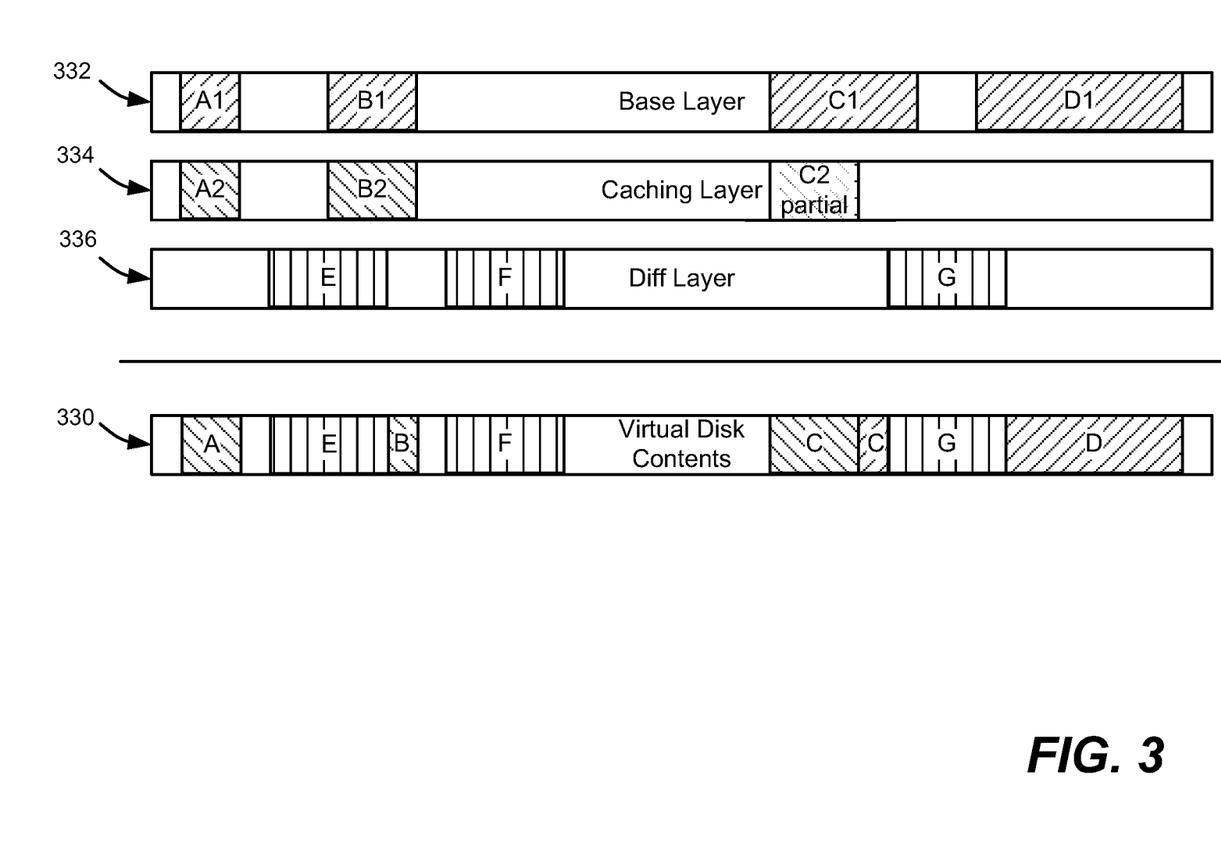
FIG. 3 is a representation of a three-layered virtual disk that may be used to provide the virtual storage device data between the far data comprising a base layer and the near data comprising two diff layers.

FIG. 3 shows a virtual disk 330 with three layers. In the context of near data and far data, the base layer 332 represents the far data 108. The caching layer 334 represents some (or possibly all) of the near data 110, which is identical to the base layer 332 in any overlapping regions; (note that in FIG. 3, only some of the base layer's data has been cached in the caching layer 334). The difference (diff) layer 336 represents the write data, which, unless written through back to the far data 108/base layer 332, is only present in the near data 110.

In either arrangement of FIG. 2 or FIG. 3, data in the diff layer overrides data in the base layer, offset by offset. In other words, if the diff layer has data for a given offset, that is the official data for that offset of the virtual storage device, regardless of what the base layer contains for that offset. The base layer (or caching layer if present) may be used to service reads of any offsets not represented in the diff layer. If no layer has data for a given offset, the virtual block storage device contains zeros for that offset, that is, reads at that offset will return zeros. Reads may be serviced partially from the diff layer, and partially from the base layer, depending on which parts of the read range is represented in the diff layer. Writes are serviced entirely by writing to the diff layer, although they may be propagated back to the base layer if desired, as described above.

As described above, a distinction is maintained between cached and written data in one implementation; in a layered configuration, if the base layer is immutable, then only any locally-written data is needed, along with the base layer, to completely define the virtual disk. The purely cached data can be discarded as desired, such as if doing so makes a later operation faster. With layered data in which there is a single diff layer as in FIG. 2, the backing file access logic 112 can internally track whether each sector or the like in the diff layer was copied from the base layer, or is the result of a virtual disk write.

With a separate caching layer and diff layer, (which may be considered two distinct "diff" layers even though data in the caching layer is not actually different from the base layer's data), the write diff layer 336 holds locally-written data, as in FIG. 3. The caching layer 334 (which can be thought of as the second diff layer, and middle layer overall) holds only data copied and cached from the base layer 332. The caching diff layer 334 is always either "not populated" for a given sector, or equal to the base layer for a given sector. As can be readily appreciated, some or all of the caching layer's data may be discarded as desired.

Note that there are arrangements other than layering for combining data into a virtual disk or the like and/or distinguishing that data, e.g., using alternative data structures to hold near and far data. For example, a system may be used to track the current location of each region of data, e.g., backed (far) or dirty (near), or backed (far), cached (near) or dirty (near). The backing data access logic 112 may maintain such a system and thereby know where to access each region of data to service a read request, and also not overwrite any dirty region in a background copy operation.

Note that as with other changes to the storage strategy of the virtual disk, changes to the layering model (e.g., changes from two layers to three layers) are allowed to be processed concurrently with usage of the virtual disk. Again, some regions of the virtual disk may have a different storage strategy than other regions.

Figure 4:
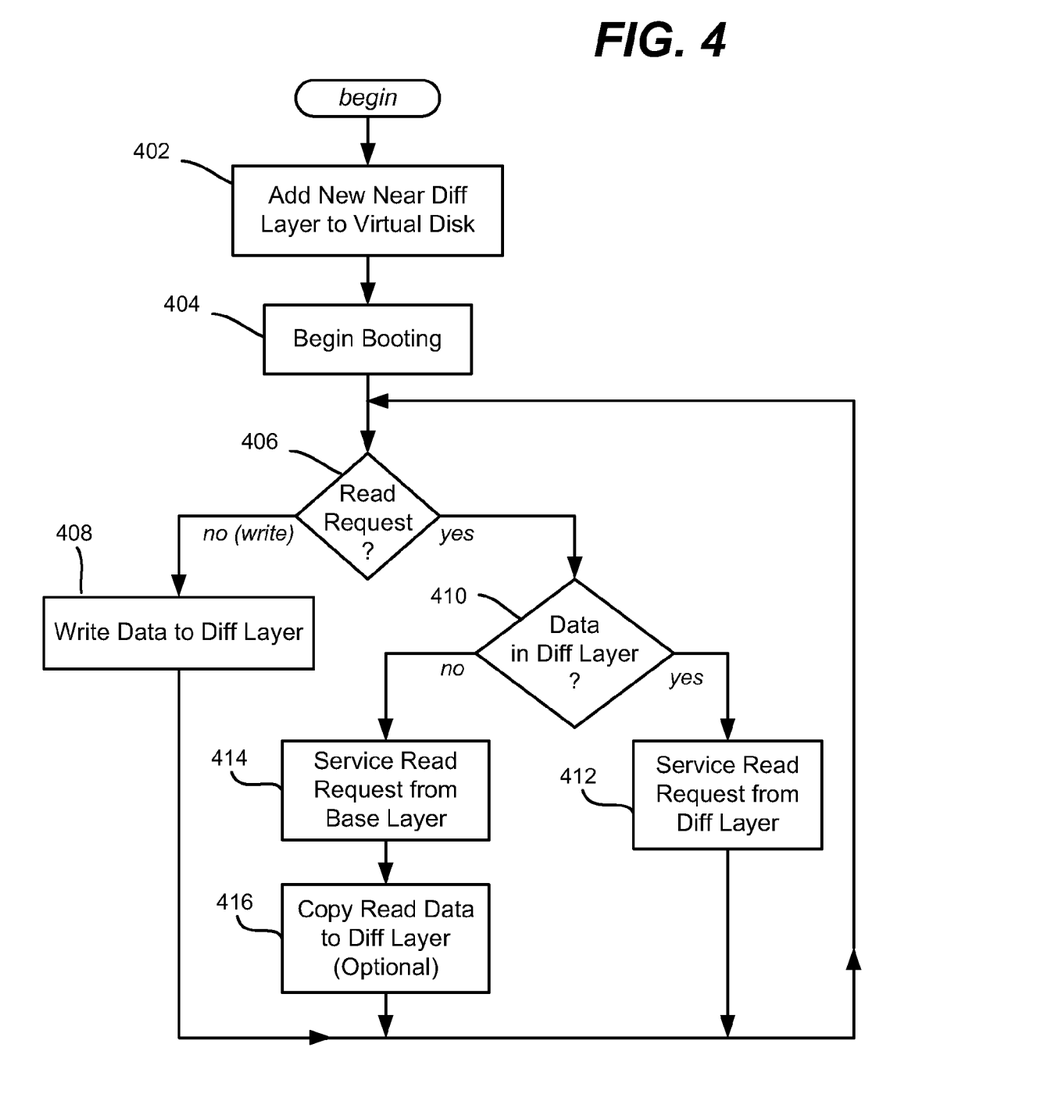
FIG. 4 is a flow diagram showing example steps that may be taken to perform operations with a virtual hard disk maintained between far and near backing stores.

FIG. 4 summarizes various example steps with respect to servicing a read or write request on an example remote disk or virtual disk configured as having a base layer and a diff layer. Note that the near data may be local storage, or a SAN LUN or other device that is "near" (having fast access) but not actually "local" in a conventional sense.

At step 402, a new diff layer is added to the near data of the virtual disk, with the pre-existing layer or layers becoming the base layer. This new diff layer is initially empty and thus the contents of the virtual disk do not change due to the addition of the diff layer. At step 404, the machine associated with the virtual disk may begin booting, even though no data is stored as near data for that machine.

As represented via steps 406 and 408, virtual disk writes to the virtual disk are stored in the near diff layer. Virtual disk reads at step 406 from the virtual disk are serviced from the near diff layer (step 412) if at step 410 the diff layer has data, or from the far base layer (step 414) if the near diff layer does not have data, on a sector-by-sector or block-by-block basis, for example, (which may vary depending on the granularity of the diff layer). Note that in a configuration in which there is a cache layer, if at step 410 the data is not in the near diff layer, the cache layer may be first checked, with data read therefrom if the read data is present in the cache layer.

Step 416 represents an optional step, in which one or more portions of a virtual disk that were read from the base layer may be written back to the diff layer, with appropriate locking (as described below) so as to ensure that any writes that may have occurred since the read was serviced are not overwritten with data from the base layer. The copying at step 416 is useful when caching as it eliminates the need to access the base layer to read the data again.

Figure 5:
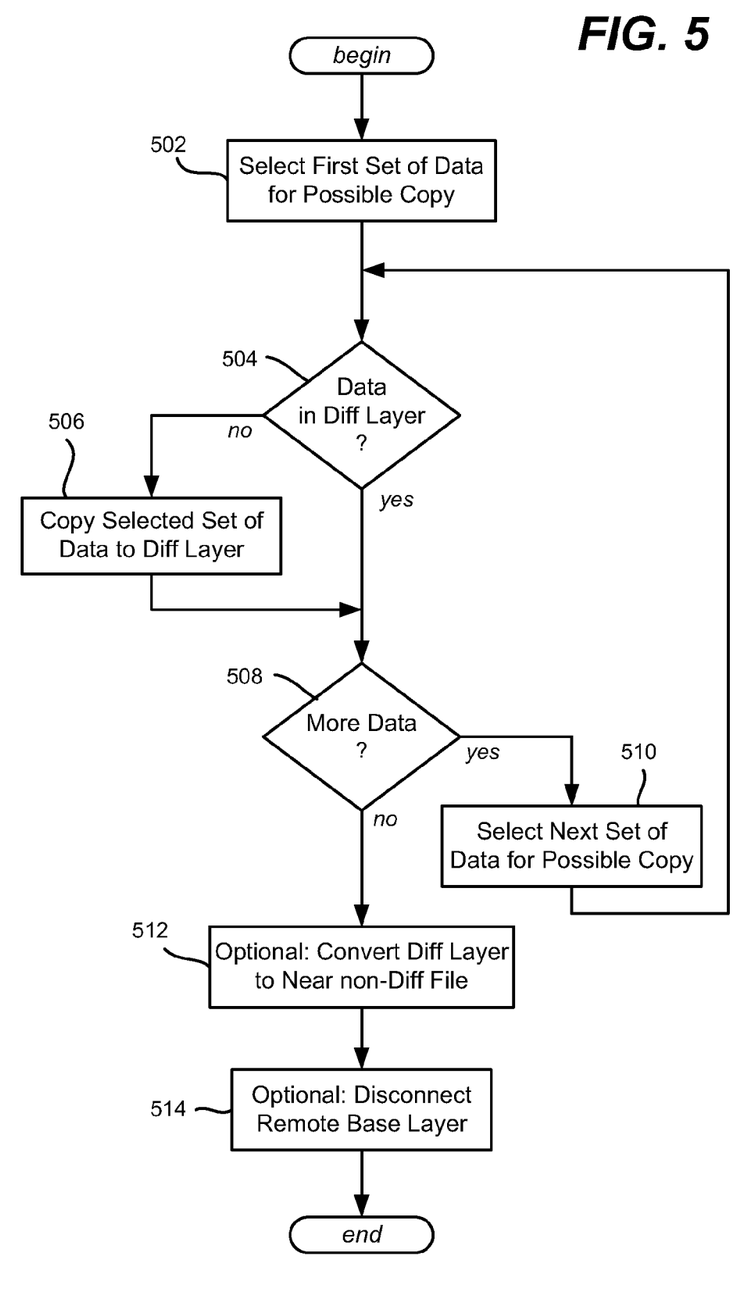
FIG. 5 is a flow diagram showing example steps that may be taken to background copy data from far data of a far backing store to near data of a near backing store.

FIG. 5 represents example steps of the background copy operation, which may occur while the virtual disk is in use by any virtual disk reads and writes as in FIG. 4. Step 502 selects a set (e.g., one or more regions/ranges) of data from the base layer. Via steps 504 and 506, any set not existing in the diff layer is read from the base layer and written to the diff layer. Note that these base reads and diff writes utilize appropriate locking (as described below) to prevent conflicts with virtual disk reads and writes.

Eventually, as represented by step 508, all of the data ranges present in the base layer are also present in the diff layer, either through writes to the diff layer (which override any data in the base layer), or through having been copied from the base layer. At this point, the virtual disk no longer needs the base layer because the virtual disk is entirely defined by the diff layer. At step 512, the diff layer may be optionally converted into a non-diff layer, and the base layer may be disconnected from the virtual disk (step 514). Note that step 514 will not be executed if data is being written-through back to the far data, for example.

Turning to another aspect, namely locking, there are data coherency problems inherent in doing a background copy (a "copy-down") operation simultaneously with virtual disk reads and writes. For example, consider a single write in progress to virtual disk sector 12. No other writes are in progress to virtual disk sector 12, so normal disk semantics require that when the write to sector 12 is done, sector 12 contains the data that was written by the write to sector 12. Consider that a concurrent copy-down copy of sector 12 data is occurring from the base layer to the (single) diff layer. This copy-down operation needs to do a write to sector 12 of the diff layer, but this write is outside the semantics of a normal disk, because the client of the virtual disk did not initiate this write. Such a write cannot disturb the semantics of a virtual disk write.

However, without locking, the copy-down write to sector 12 of the diff area may occur just after the virtual disk write to sector 12. If this occurs, the virtual disk write to sector 12 is erroneously overwritten with older data, making the virtual disk appear to have failed to write to sector 12, or to have written to sector 12 and then gone back to old data in sector 12. This is not acceptable disk semantics.

One approach to solving this problem is to simply prevent copy-down reads and writes from occurring concurrently with virtual disk reads and writes, regardless of read versus write, and regardless of whether the operations share any sectors in common. However, this approach is unnecessarily conservative, and unnecessarily slows down virtual disk I/O for the duration of the overall copy-down operation.

Another approach to solving this problem is to prevent copy-down reads and writes from occurring concurrently with virtual disk reads and writes that share sectors in common. This only impacts performance on virtual disk I/Os that actually overlap currently-in-progress copy-down I/Os, however it still may be unnecessarily conservative and slows down virtual disk I/O to an extent.

Depending on the implementation, it may be necessary to explicitly exclude concurrent reads to the same sector of the same diff layer that is currently being written, because that data is not yet fully present. This may be implicitly ensured by not marking the sectors as present in the relevant diff layer until the write to that diff layer is complete.

Any portion of a "copy down" write that becomes irrelevant (covered) by a diff layer write cannot overwrite data in that covering diff layer. This needs to be dealt with in the two-layer arrangement. Note that as in FIG. 5 (via step 504), data already covered by a diff layer write (probably) will not be read from the base layer for copy-down purposes. However, once a copy-down "read from base then write to diff" operation begins, the read from base will proceed, potentially concurrently with virtual disk writes to overlapping sectors. Once the base layer read has completed, the write to the diff layer occurs normally.

This write-to-diff portion of the operation needs to first acquire a write lock on the relevant sectors of the diff layer on which the write is being attempted. After the write lock is acquired, which guarantees that no virtual disk writes are currently in-progress to the diff layer, the diff layer is re-checked. If a sector of the diff layer is populated, meaning that the sector of the virtual disk was written to, the copy-down data for that sector cannot be written to the diff layer and instead is discarded. This determination is made sector-by-sector in an appropriate implementation.

If the implementation is such that diff layers are maintained at granularity of a block which is larger than a sector, then a virtual disk write to a diff layer cannot occur until the corresponding block has been first copied-down from the base layer. This is additional overhead incurred the first time a virtual disk write to a block occurs, however it simplifies the locking because copy-down operations need only consider whether a diff layer is populated on a per-block basis instead of a per-sector basis.

In this way, a virtual disk maintains semantics that are equivalent to (or better than) a physical disk. Virtual disk writes that must not complete until the written data is fully committed to the non-volatile storage of the virtual disk may be marked as such, e.g., as "force unit access." Virtual disk writes not so marked are those committed at least to a coherent cache of the contents of the virtual disk. The result is that reads of data initiated after a write completes get a version of the data that reflects the write, which does not change unless another write occurs to the same virtual disk location. Thus, the contents of the virtual disk do not change except as a result of specific operations that are allowed to modify the contents of the virtual disk. For example, a write may change the contents of the virtual disk. As another example, an optimized zeroing operation may zero a portion of the virtual disk. The contents of the virtual disk do not change due to internal operations such as copy-down operations.

As described above, write-through depth refers to allowing writes to be "written through" to a configurable layer, and made consistent with respect to the layers up to that layer. This allows local caching to coexist with conventional fast-boot, e.g., from a reliable SAN LUN.

If data is being written through to a SAN LUN, it is unlikely that the SAN LUN is removed from the set of layers being used, (because typically the point of using a SAN LUN is to get reliability and/or the feature set of the SAN LUN). However, if at any point the administrator decides that the SAN LUN is unnecessary for a particular virtual disk, the SAN LUN may be released as described above, provided that the data is done being copied down to a lower layer.

When write-through to a layer other than the diff layer occurs, (e.g., the base layer, or if the base layer is read-only, to another diff file kept in far storage which may be basically hidden from the machine), the lower diff layer or layers may contain no data, cached data, or dirty data. A "no data" situation may occur if the copy-down from the base layer has not yet occurred or is not desired. In this event, the write-through occurs to the base layer and the contents of the virtual block device correctly show the written data, because the diff layer is not overriding what was written.

For cached data write-through, which may occur if some copy-down from the base layer has already occurred, the data in the cache layer needs to be discarded, or overwritten so that it is equal to the newly-written data. If discarded, then some of the copy-down operation is effectively undone, however this potentially allows the write to complete sooner. If it is written to be equal to the newly-written data, this means the same data is written to two layers concurrently.

When a single write turns into a concurrent write of the same data to two layers, coherency needs to be maintained in the presence of another concurrent virtual disk write that is writing different data to the same sectors (or some of the same sectors). As a result, a virtual disk write being written concurrently to two layers needs to prevent another virtual disk write from occurring concurrently to an overlapping byte range, so that the contents of both layers end up equal after the layer writes generated by the first virtual disk write have completed. Then the second virtual disk write may proceed with its own two layer writes.

Dirty data may occur if combined with other technology, or if the write-through layer was modified recently to be another layer in the chain, and that change in storage strategy has not yet been completed. The dirty data may either be replaced with the newly-written data by doing a write only in the diff layer, or the dirty data may be overwritten by new data in the diff layer concurrently with the new data also being written through to the base layer. For a write only in the diff layer, that part of the diff layer still contains dirty data. For concurrent overwriting of the diff and base layer, that part of the diff layer contains clean cached data.

Exemplary Operating Environment

Figure 6:
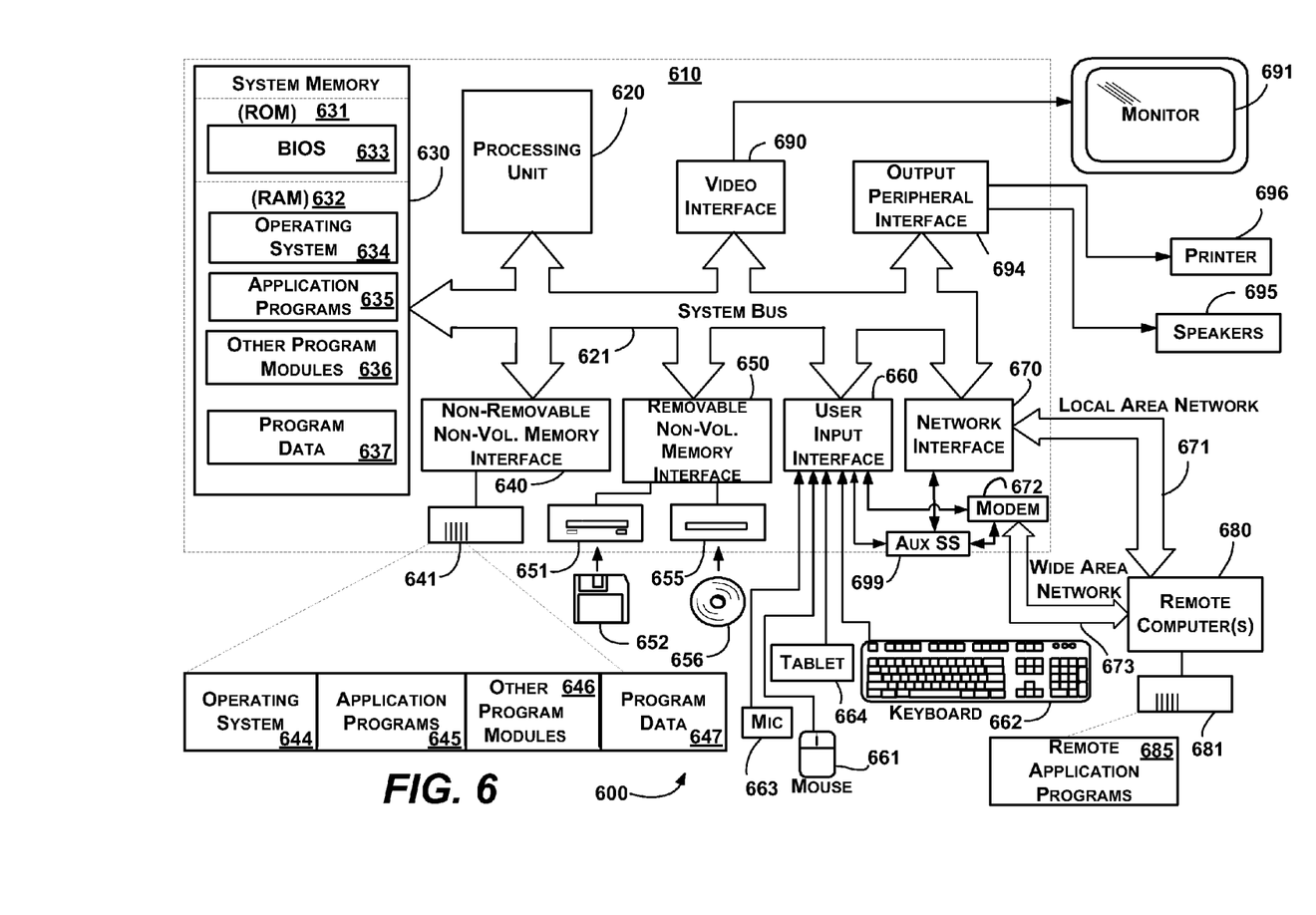
FIG. 6 shows an illustrative example of a computing environment into which various aspects of the present invention may be incorporated.

FIG. 6 illustrates an example of a suitable computing and networking environment 600 on which the examples of FIGS. 1-5 may be implemented. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 6, an exemplary system for implementing various aspects of the invention may include a general purpose computing device in the form of a computer 610. Components of the computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 610 typically includes a variety of computer-readable media. Computer-readable media can be any available media that can be accessed by the computer 610 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 610. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636 and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media, described above and illustrated in FIG. 6, provide storage of computer-readable instructions, data structures, program modules and other data for the computer 610. In FIG. 6, for example, hard disk drive 641 is illustrated as storing operating system 644, application programs 645, other program modules 646 and program data 647. Note that these components can either be the same as or different from operating system 634, application programs 635, other program modules 636, and program data 637. Operating system 644, application programs 645, other program modules 646, and program data 647 are given different numbers herein to illustrate that, at a minimum, they are different copies. A user may enter commands and information into the computer 610 through input devices such as a tablet, or electronic digitizer, 664, a microphone 663, a keyboard 662 and pointing device 661, commonly referred to as mouse, trackball or touch pad. Other input devices not shown in FIG. 6 may include a joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. The monitor 691 may also be integrated with a touch-screen panel or the like. Note that the monitor and/or touch screen panel can be physically coupled to a housing in which the computing device 610 is incorporated, such as in a tablet-type personal computer. In addition, computers such as the computing device 610 may also include other peripheral output devices such as speakers 695 and printer 696, which may be connected through an output peripheral interface 694 or the like.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include one or more local area networks (LAN) 671 and one or more wide area networks (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660 or other appropriate mechanism. A wireless networking component such as comprising an interface and antenna may be coupled through a suitable device such as an access point or peer computer to a WAN or LAN. In a networked environment, program modules depicted relative to the computer 610, or portions thereof, may be stored in the remote memory storage device. By way of example, and not limitation, FIG. 6 illustrates remote application programs 685 as residing on memory device 681. It may be appreciated that the network connections shown are exemplary and other means of establishing a communications link between the computers may be used.

An auxiliary subsystem 699 (e.g., for auxiliary display of content) may be connected via the user interface 660 to allow data such as program content, system status and event notifications to be provided to the user, even if the main portions of the computer system are in a low power state. The auxiliary subsystem 699 may be connected to the modem 672 and/or network interface 670 to allow communication between these systems while the main processing unit 620 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a system comprising, a virtual storage device for a machine that is coupled to a near backing store, and coupled to far backing store, at least until far data of the far backing store is not needed by the machine, the far data comprising a base layer for the virtual storage device, the near data comprising at least one differencing layer corresponding to the base layer, the machine including access logic that services a read operation from near data of the near backing store when data corresponding to the read operation is available in the near backing store, or otherwise services the read from the far data.

2. The system of claim 1 wherein the machine includes firmware that obtains boot code and data from remote storage to perform reads to boot an operating system of the machine.

3. The system of claim 2 wherein the firmware obtains the boot code and data via PXE technology, via iSCSI technology, or via Fibrechannel over Ethernet technology.

4. The system of claim 1 wherein the virtual storage device comprises a virtual hard disk, or wherein the machine comprises a virtual machine, or wherein both the virtual storage device comprises a virtual hard disk and the machine comprises a virtual machine.

5. The system of claim 1 wherein the access logic performs a background copy operation to copy at least some of the far data to become near data.

6. The system of claim 1 wherein the read operation is serviced from the far data, and wherein the access logic maintains a copy of data corresponding to the read operation in a cache in the near data.

7. The system of claim 1 wherein the near data comprises a differencing layer that maintains written data corresponding to writes to the virtual storage device.

8. The system of claim 7 wherein the machine writes-through the written data to at least one other layer.

9. The system of claim 1 wherein the far backing store is distributed among a plurality of locations.

10. The system of claim 1 wherein the near data includes a caching layer that maintains data corresponding to data copied from the far data, and wherein the data copied from the far data corresponds to data obtained by servicing a read request, or obtained via a background copy operation, or both obtained by servicing a read request and obtained via a background copy operation.

11. The system of claim 1 wherein the near data includes a differencing layer that maintains written data corresponding to writes to the virtual storage device, and maintains cached data corresponding to data copied from the far data, in which the machine maintains information that distinguishes the written data from the cached data.

12. The system of claim 1 wherein the near data includes a first differencing layer that maintains cached data corresponding to data copied from the far data, and a second differencing layer that maintains data corresponding to writes to the virtual storage device.

13. The system of claim 1 wherein the near backing store comprises a network disk.

14. In a computing environment, a method performed on at least one processor, comprising, providing a virtual disk having a base layer as far data and at least one differencing layer as near data, starting an operating system boot process by downloading boot code from the far data, servicing read operations from the near data when data corresponding to the read operation is available in a differencing layer of the near data or from the base layer when not available, and servicing write operations by writing data corresponding to the write operation to a differencing layer of the near data.

15. The method of claim 14 wherein the near data includes a write differencing layer and a cache layer, and wherein servicing the read operations for a requested set of data comprises, reading the requested set of data from the write differencing layer if the requested set of data is available from the write differencing layer, and if not, reading the requested set of data from the cache layer if the requested set of data is available from the cache layer, and if not, reading the requested set of data from the base layer.

16. The method of claim 14 further comprising performing a copy-down operation to copy data from the base layer to a differencing layer of the near data.

17. The method of claim 16 further comprising, stopping communications to obtain far data once all data needed as near data has been copied from the base layer.

18. The method of claim 14 further comprising, changing a storage strategy while servicing reads and writes, including changing a number of layers of the near data, or changing whether a layer other than a write differencing layer receives written data corresponding to the write operation.

19. One or more computer-readable media having computer-executable instructions, which when executed perform steps, comprising: starting an operating system boot process on a machine by downloading boot code from far data; accessing a virtual disk via the machine, the virtual disk having a base layer in the far data and at least one differencing layer in near data to service read and write operations, including, servicing read operations from a differencing layer of the near data when data corresponding to the read operations is available therefrom, or from the base layer when not available, storing the data corresponding to the read operations in a cache layer, and servicing write operations by writing data corresponding to the write operations to a differencing layer of the near data; and in a copy-down operation, copying at least some of the data from the base layer or the cache layer to a differencing layer of the near data.

* * * * *